(12) United States Patent
Takenaga et al.

(10) Patent No.: US 6,356,206 B1
(45) Date of Patent: Mar. 12, 2002

(54) RUNNING SURROUNDINGS RECOGNIZING APPARATUS

(75) Inventors: Hiroshi Takenaga; Hiroto Morizane, both of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/453,219

(22) Filed: Dec. 3, 1999

(30) Foreign Application Priority Data

Dec. 3, 1998 (JP) .......................................... 10-344135

(51) Int. Cl.⁷ ................................................. G08G 1/16
(52) U.S. Cl. ....................... 340/903; 340/905; 340/933; 348/148
(58) Field of Search ................................ 340/903, 933, 340/905; 348/118, 148, 149

(56) References Cited

U.S. PATENT DOCUMENTS 6,046,766 A * 4/2000 Sakata ........................ 348/148
6,166,764 A * 12/2000 Sakata ........................ 348/148

* cited by examiner

*Primary Examiner*—Edward Lefkowitz
(74) *Attorney, Agent, or Firm*—Crowell & Moring LLP

(57) ABSTRACT

A running surrounding recognizing apparatus is provided. The running surrounding recognizing apparatus is capable of accurately recognizing information in regard to running of a self-vehicle even if a mounting position of a sensor for running surrounding recognition is changed, and to provide a vehicle running control apparatus using the running surrounding recognizing apparatus. The running surrounding recognizing apparatus 1 comprises a communication part 11, a sensing region determining part 12 for determining a sensing region sensed by the running surrounding recognizing apparatus 1 and a sensing part 13. The communication part 11 is connected to external units through a bus 1200 to communicate data in regard to a mounting position of the running surrounding recognizing apparatus 1 on a vehicle. The sensing region determining part 12 determines the sensing region sensed by the running surrounding recognizing apparatus 1 based on the data in regard to a mounting position of the running surrounding recognizing apparatus 1 on a vehicle received through the communication part 11. The sensing part 13 outputs a sensed result based on the sensing region determined by the sensing region determining part 12 through the communication part.

7 Claims, 12 Drawing Sheets

RUNNING SURROUNDINGS RECOGNIZING APPARATUS

BACKGROUND OF THE INVENTION

1. Field of the Invention

The present invention relates to a running surroundings recognizing apparatus and a running surroundings recognizing system which recognize information on the running surroundings of a self-vehicle using a running surroundings recognizing sensor mounted on the vehicle.

2. Description of the Related Art

As performance of a vehicle is improved, it becomes important to equip the vehicle with a preventive safety functions of recognizing the running surroundings such as a running lane, the other vehicles, detecting a possible status of occurrence of accident, and calling the driver's attention for operation of avoiding a danger by sounding an alarm, or automatically controlling the vehicle to actively prevent the accident.

An important thing in order to realize the preventive safety functions is an apparatus for recognizing running surroundings using a sensor. In order to realize the running surroundings recognizing apparatus of such a kind, a camera, a laser radar, an extremely high frequency radar or the like have been commonly used.

In detail, a following distance alarm system, which measures a distance to a preceding vehicle running before a self-vehicle and sounds an alarm when the distance between the vehicles becomes smaller than a preset value, is becoming commercially available. Further, a system not only cautioning the driver, but positively controlling the vehicle, for example, an auto-cruise system, which controls running so as to keep the following distance constant, is becoming commercially available.

However, because the laser radar or the extremely high frequency radar (hereinafter, referred to as "radar") used in these systems is required to measure a distance to a preceding vehicle 41 running far away ahead of a self-vehicle 40 with a limited electric power, there is a disadvantage in that width of the radar can not be widened and accordingly the sensing region 43 is narrow, as shown in FIG. 4. Therefore, when a vehicle is cutting in between the preceding vehicle 41 and the self-vehicle, the driver feels uneasy because the alarm does not sound or the control of constant following distance running does not work until the cutting-in vehicle comes very close to the self-vehicle. Further, when the cutting-in vehicle is sensed, the driver fees uncomfortable because the self-vehicle is suddenly decelerated, for example, during constant following distance running.

Sensing of a cutting-in vehicle is, therefore, a important problem, and a detection system for detecting a vehicle cutting in ahead of a self-vehicle is disclosed in Japanese Patent Application Laid-Open No.7-230600. In this apparatus, a cutting-in vehicle is detected as follows. An image within a range of vision 44 of a camera in front of the self-vehicle is imaged using the camera, and using the image a width of an object estimated to be a preceding vehicle 42 is detected from a traffic lane of the self-vehicle running and an outline of the image. A cutting-in width of the object estimated to be the preceding vehicle 42 into the traffic lane is obtained, and a degree of cutting-in is calculated based on the width of the object and the cutting-in width, and then alarm generation is switched to brake control depending on the magnitude of the degree of cutting-in.

If a distance to the cutting-in vehicle is estimated, the distance can be calculated through a coordinate transformation based on a position in the image.

However, the above conventional technology does not take it into consideration that the height of the vehicle is varied depending on number of passengers and accordingly the height of the camera mounted on the vehicle is changed. Further, since a mounting position of the camera is varied depending on a type and design of a vehicle, in most cases an actual mounting position of the camera does not agree with the design value and consequently fine adjustment (hereinafter, referred to as tuning) is always required. Nevertheless, the conventional technology is difficult to cope with the problem. This matter will be described in detail below.

Estimation of a distance to a cutting-in vehicle from an image imaged by a camera is performed as follows. Here, coordinate transformation between a coordinate system taking a lens of the camera as the origin (called as a world coordinate system) and a coordinate system set on the image plane (called as an image coordinate system).

These matters will be described below, according to the following order.

A. Definitions of the world coordinate system and the image coordinate system

B. Estimation of a distance of a cutting-in vehicle on the image coordinate system A. Regarding definitions of the world coordinate system and the image coordinate system <World coordinate system>

As shown in FIG. 2, the world coordinate system X, Y, Z) is a coordinate system fixed on a vehicle and a right-hand coordinate system taking the heading direction of the vehicle from the center of the lens as Z-axis. Therefore, the origin (0, 0, 0) is the center of the lens.

<Image coordinate system>

As shown in FIG. 2, x-axis of the image coordinate system (x, y) is parallel to and in the direction opposite to the X-axis of the world coordinate system, and y-axis is in the direction opposite to the Y-axis and vertically inclines to the optical axis of the lens of the imaging apparatus by an inclination angle (angle of depression) ø.

Accordingly, letting the focal distance of the lens of the camera of the imaging apparatus be F. the origin of the image coordinate system becomes (0. F sin ø, −F cos ø) in the world coordinate system.

Relation between a point P (X, Y, Z) in the world coordinate system and a point q (x, y) in the image coordinate system which is the point P projected on the image can be expressed by the following Equation 1.

$$x = -FX/(Z \cos ø - Y \sin ø)$$
$$y = -F(Y \cos ø - Z \sin ø)/(Z \cos ø - Y \sin ø) \quad \text{(Equation 1)}$$

B. Regarding estimation of a distance of a cutting-in vehicle on the image coordinate system Letting a height from the road surface to the center of the lens of the camera be Yd, the coordinates of the cutting-in vehicle become the coordinates (X, −Yd, Z) in the world coordinate system because the cutting-in vehicle P is running on the road. Therefore, the coordinates of the cutting-in vehicle P can be expressed by the following Equation 2.

$$X = -(Z \cos ø - Yd \sin ø)/F$$
$$Z = (FYd \cos ø - yYd \sin ø)/(y \cos ø - F \sin) \quad \text{(Equation 2)}$$

Using Equation 2, the position of the cutting-in vehicle can be related with the position in the image.

It can be understood from Equation 2 that when the mounting position Yd of the camera is varied, the accuracy of the position of the cutting-in vehicle is largely affected.

Although the example of the running surrounding recognizing apparatus employing the camera as the imaging apparatus (sensor) is described here, the similar problem occurs whatever sensor for recognizing running surroundings, that is, a sensor other than a camera, for example, a radar is employed.

That is, the sensing region of the sensor is a region on the image coordinate system which is set corresponding to the sensor. By displacement in the mounting position of the sensor from the design value which may be caused at mounting it to the vehicle, or by lowering of the vehicle caused by load or number of passengers, or by change in the attitude of the vehicle caused a running condition, the mounting position or attitude of the sensor of the running surrounding recognizing apparatus is changed. The position of the detecting region on the image coordinate system is also changed corresponding to change in the mounting position or the attitude of the sensor.

SUMMARY OF THE INVENTION

In order to solve the above problem, an object of the present invention is to provide a running surrounding recognizing apparatus which is capable of accurately recognizing information in regard to running of a self-vehicle even if a mounting position of a sensor for running surrounding recognition is changed, and to provide a vehicle running control apparatus using the running surrounding recognizing apparatus.

In order to attain the above object, a running surrounding recognizing apparatus in accordance with the present invention is mounted on a vehicle and recognizes running surroundings of the vehicle using a sensor, and the running surrounding recognizing apparatus comprises a communication means for receiving data in regard to a mounting position of the sensor on the vehicle input from the external; a sensing region determining means for determining a sensing region which is sensed by the sensor based on the data received through the communication means; and a recognizing means for recognizing running surroundings from the sensing region determined by the sensing region determining means and a sensed result by the sensor.

Further, in order to attain the above object, a running surrounding recognizing apparatus in accordance with the present invention is mounted on a vehicle and recognizes running surroundings of the vehicle using a sensor, and the running surrounding recognizing apparatus comprises a receiving means for receiving data in regard to a sensing region of the sensor input from the external; and a recognizing means for recognizing running surroundings from the received sensing region and a sensed result by the sensor. Furthermore, a running surrounding recognizing system may be constructed using a plurality of such running surrounding recognizing apparatus.

DESCRIPTION OF THE PREFERRED EMBODIMENTS

An embodiment of a running surrounding recognizing apparatus in accordance with the present invention will be described below, referring to FIG. 1.

Figure 1:
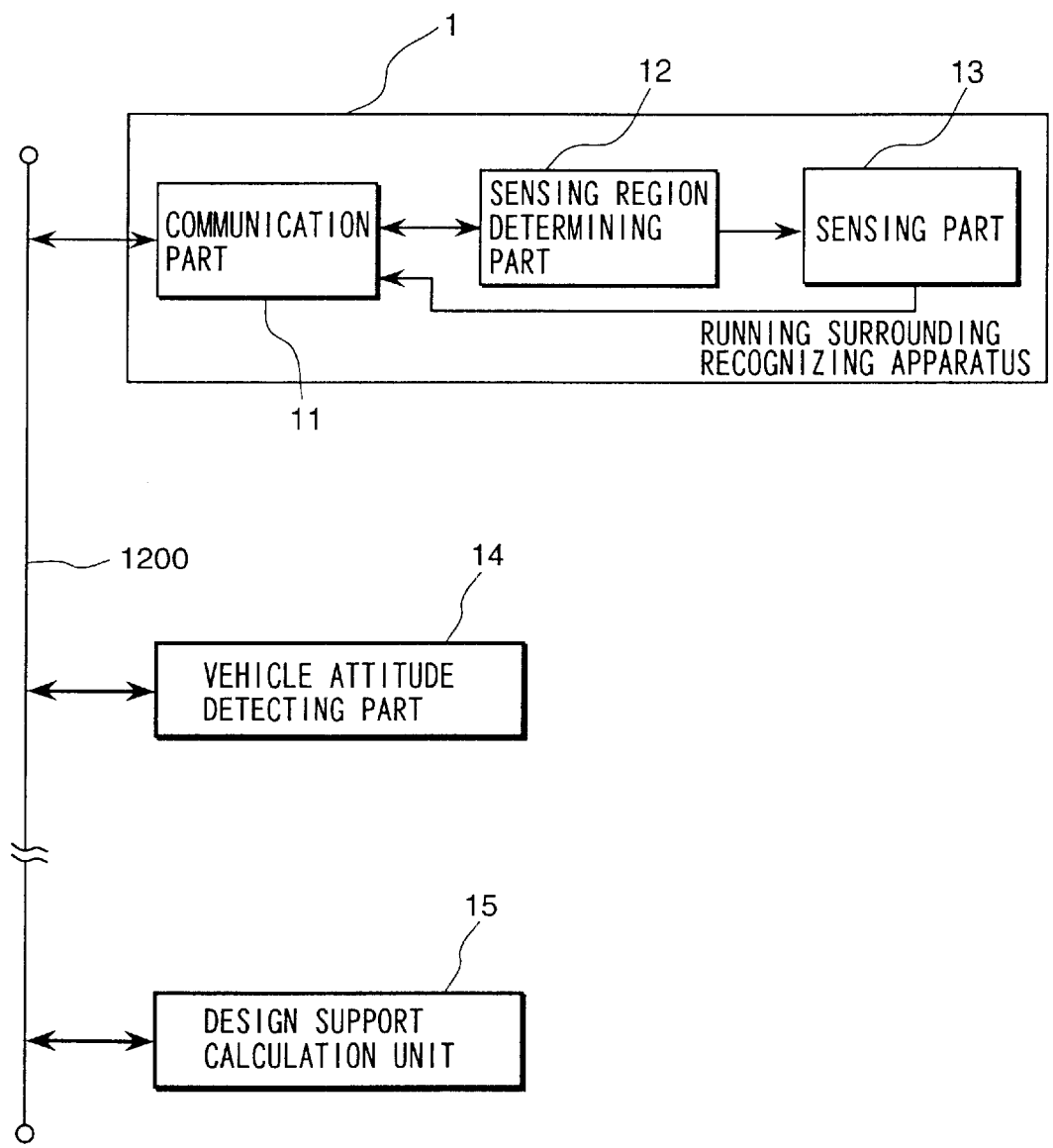
FIG. 1 is a block diagram showing the construction of an example of a running surrounding recognizing sensor in accordance with the present invention.
Figure 2:
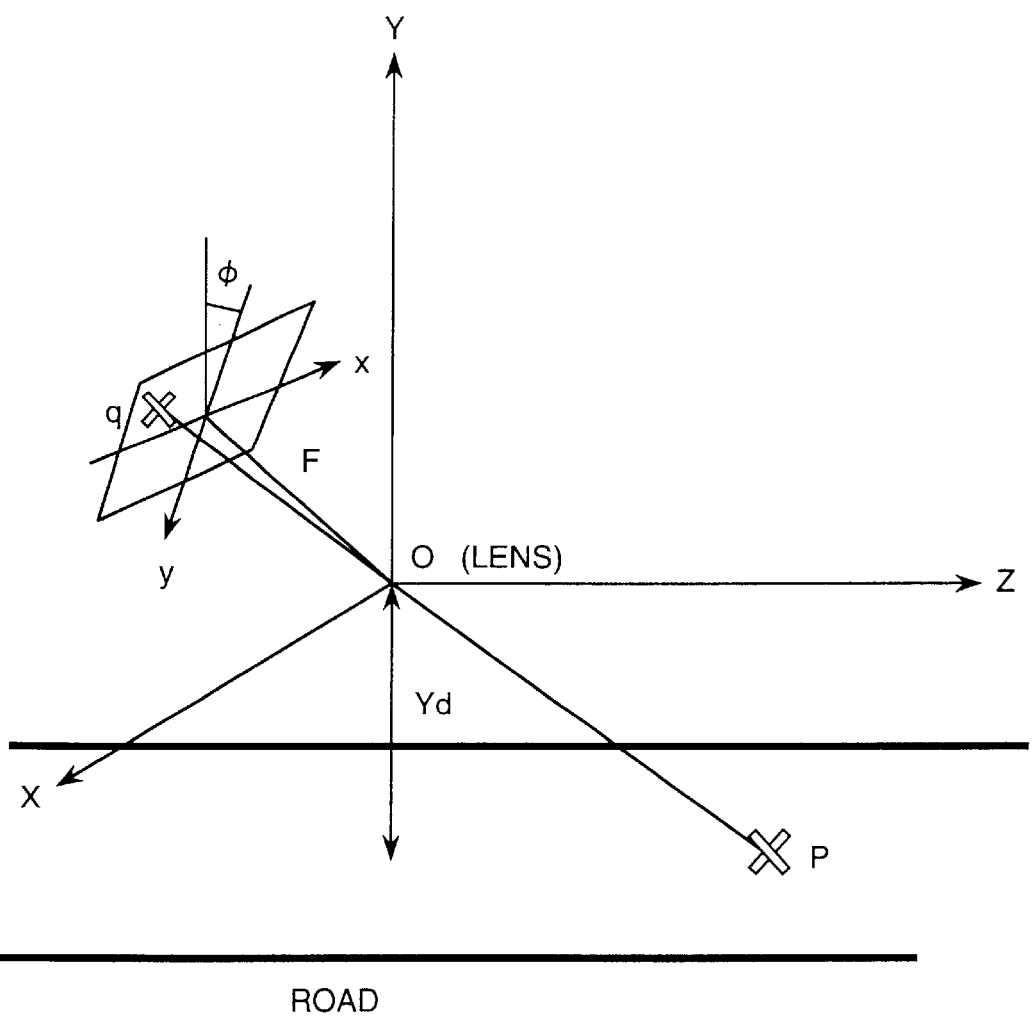
FIG. 2 is a view explaining a world coordinate system and an image coordinate system.

As shown in FIG. 1, the running surrounding recognizing apparatus 1 in accordance with the present invention comprises a communication part 11, a sensing region determining part 12 and a sensing part 13 having a sensor.

The communication part 11 is connected to external units through a bus 1200 to communicate data in regard to a mounting position of the running surrounding recognizing apparatus 1 on to a vehicle. The external units are a vehicle attitude detecting part 14 for detecting lowering of the vehicle, a design support calculation unit 15 for inputting a design value or an actually measured mounted position value and so on. The communication part 11 may be realized by a known data communication means such as RS232C or the like.

The sensing region determining part 12 determines a sensing region sensed by the running surrounding recognizing apparatus 1 based on the data in regard to the mounting position of the running surrounding recognizing apparatus 1 onto the vehicle received through the communication part 11. The sensing region determining part 12 comprises a memory part and a processing part of the information. The memory part stores data in regard to the mounting position of the running surrounding recognizing apparatus onto the vehicle transmitted from the design support calculation unit 15 or the vehicle attitude detecting part 14 through the communication part 11, and the processing part determines a sensing region based on the stored data.

For example, in a case of using a camera as the sensor (sensing means) of the running surrounding recognizing apparatus 1, information in regard to the mounting position of the running surrounding recognizing apparatus 1 such as a focal distance F, an angle of depression φ, a mounting height Yd shown in Equation 1 and vehicle characteristics is stored in the memory part. When, for example, a new mounting height Y*d is transmitted from the communication part 11, the mounting height Yd is replaced by the Y*d. When a load distribution of a driver seat, a seat next to the driver and rear seats is transmitted, the height Yd and the angle of depression φ are corrected by judging a lowering degree of the vehicle from the vehicle characteristic stored in the sensing region determining part 12 to determine a sensing region corresponding to the corrected values.

The sensing part 13 comprises a sensing part such as a camera or a radar for sensing external surroundings and a processing part for executing predetermined processing to recognize specified running surroundings using the information in regard to the sensed external surroundings, and obtains a recognized result in regard to the external surroundings based on the sensing region determined by the sensing region determining part 12 to output the recognized result to the external directly or through the communication part 11. For example, in a case where a cutting-in vehicle is sensed using a camera as the sensor, the sensing part 13 performs judgment through the method disclosed in Japanese Patent Application Laid-Open No.7-230600, and the position of the cutting-in vehicle is calculated by Equation 2 described above using the corrected height Yd and the corrected angle of depression φ. The detecting method of a cutting-in vehicle is to be described later in detail.

Figure 3:
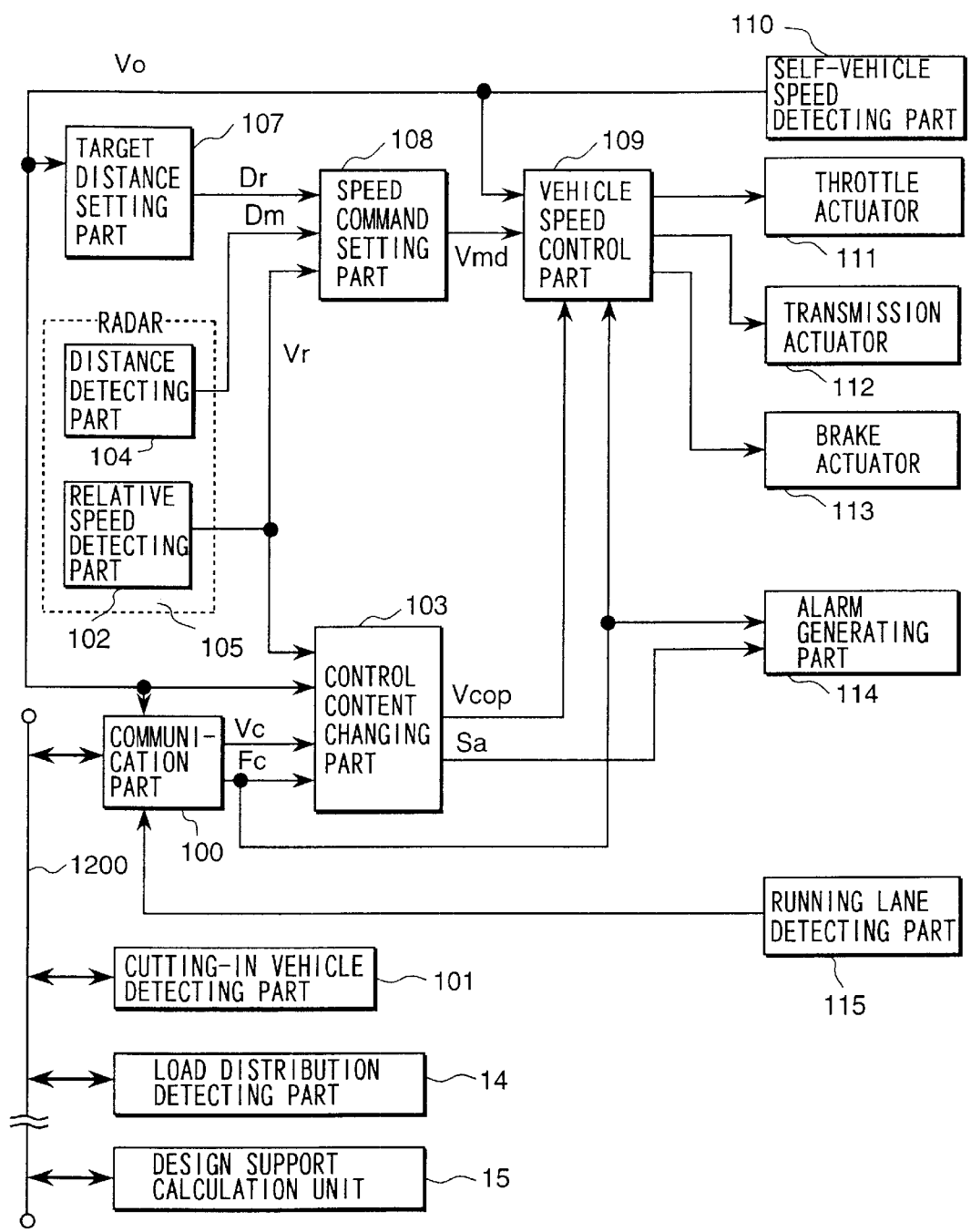
FIG. 3 is a block diagram showing the construction of an embodiment of a vehicle running control apparatus using a running surrounding recognizing sensor in accordance with the present invention.
Figure 4:
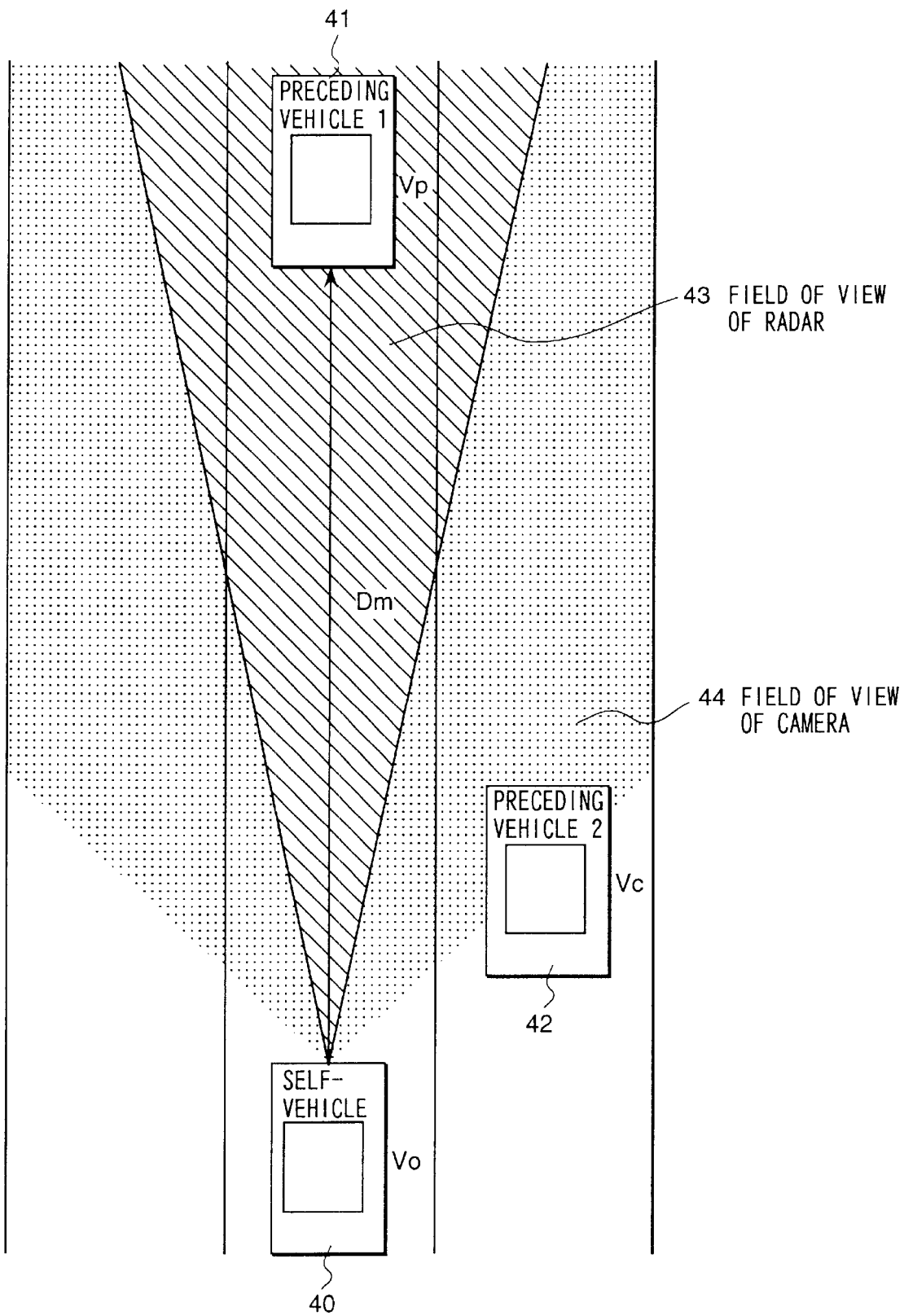
FIG. 4 is a view explaining following distance control using a radar and fields of view of the radar and a camera.

An embodiment of a vehicle running control apparatus using the running recognizing apparatus 1 in accordance with the present invention will be described below, referring to FIG. 3.

The vehicle running control apparatus of this embodiment is composed of a cutting-in vehicle detecting part 101 constructed by the running surrounding recognizing apparatus 1 in accordance with the present invention and a main apparatus for controlling running operation of the vehicle by sending and receiving data to and from the cutting-in vehicle detecting part 101 through a bus 1200. The cutting-in vehicle detecting part 101 is also connected to the load distribution detecting part 14 and the design support calculation unit 15 through the bus 1200 so as to perform communication.

The main apparatus comprises a communication part 100 for performing communication with the external units through the bus 1200, a control content changing part 103, a target distance setting part 107, a speed command setting part 108, a vehicle speed control part 109, a radar 105 having a relative speed detecting part 102 and a distance detecting part 104, a self-vehicle speed detecting part 110, a throttle actuator 111, a transmission actuator 112, a brake actuator 113, an alarm generating part 114 and a running lane detecting part 115.

Although the cutting-in vehicle detecting part 101 is separated from the main apparatus in the construction of this embodiment, the present invention is not limited to the above construction. For example, it would be possible that the above-mentioned main apparatus is divided into a plurality of units and the divided units are connected to the cutting-in vehicle detecting part 101 with the bus or an in-vehicle LAN. Further, running control processing performed in the present invention is not limited to the method in an example to be described below, the other processing method would be used as far as the method executing speed control of a vehicle using a detected result from the cutting-in vehicle detecting part 101.

An outline of the overall operation will be described first, and then detailed operation of each part will be described.
(Outline of Operation)

In the present embodiment, as the running surrounding recognizing apparatus 1 constructed is the cutting-in vehicle detecting part 101 which detects a vehicle being cutting in between a self-vehicle and a preceding vehicle using a camera. The cutting-in vehicle detecting part 101 detects and tracks the vehicle passing the self-vehicle by image processing, and calculates a position and a speed of the passing vehicle. Then it is judged from a speed and a position of the self-vehicle and the position of the passing vehicle whether or not the passing vehicle is a cutting-in vehicle.

Although the present embodiment is described on a case where the cutting vehicle detecting part 101 is constructed as the running surrounding recognizing apparatus 1, the detailed construction of the present invention is not limited by the cutting vehicle detecting part. It would be possible to form constructions for detecting the other kinds of running surrounding using the other sensing means, for example, a construction for detecting a following distance using a radar may be formed.

Further, the vehicle running control apparatus of the present embodiment comprises the control content changing part 103 for changing the speed control content of the self-vehicle corresponding to a detected result of the cutting-in vehicle detecting part 101. When the cutting-in vehicle detecting part 101 detects a cutting-in vehicle, the control content changing part 103 generates a speed command by judging whether the self-vehicle runs at a speed by keeping the speed of the self-vehicle at that time, runs at a speed by decelerating the speed of the self-vehicle at that time by a preset rate, or runs at a lower speed by comparing the speed of the self-vehicle at that time with a speed of the cutting-in vehicle.
(Detailed Operation)

The cutting-in vehicle detecting part 101 outputs a cutting-in vehicle detection flag Fc indicating presence or absence of a cutting-in vehicle and a speed Vc of the cutting-in vehicle. The control content changing part 103 outputs a speed command Vcop based on the cutting-in vehicle detection flag Fc, the speed Vc of the cutting-in vehicle and a speed Vo of the self-vehicle detected by the self-vehicle speed detecting part 110.

On the other hand, the radar 105 composed of the relative speed detecting part 102 and the distance detecting part 104 detects a measured distance Dm and a measured relative speed Vr. The target distance setting part 107 sets a target distance Dr based on the self-vehicle speed Vo detected by the self-vehicle speed detecting part 110. The speed command setting part 108 sets a speed command Vcmd based on the target distance Dr, the measured distance Dm and the measured relative speed Vr.

Then, the vehicle speed control part 109 calculates a throttle opening command, a transmission command and a brake command based on the self-vehicle speed Vo, the speed command Vcmd, the cutting-in vehicle detection flag Fc and the speed command Vcop, and drives the throttle actuator 111, the transmission actuator 112 and the brake actuator 113. The alarm generating part 114 generates a driver alarm for informing the driver of existence of a cutting-in vehicle based on the cutting-in vehicle detection flag Fc.

Figure 5:
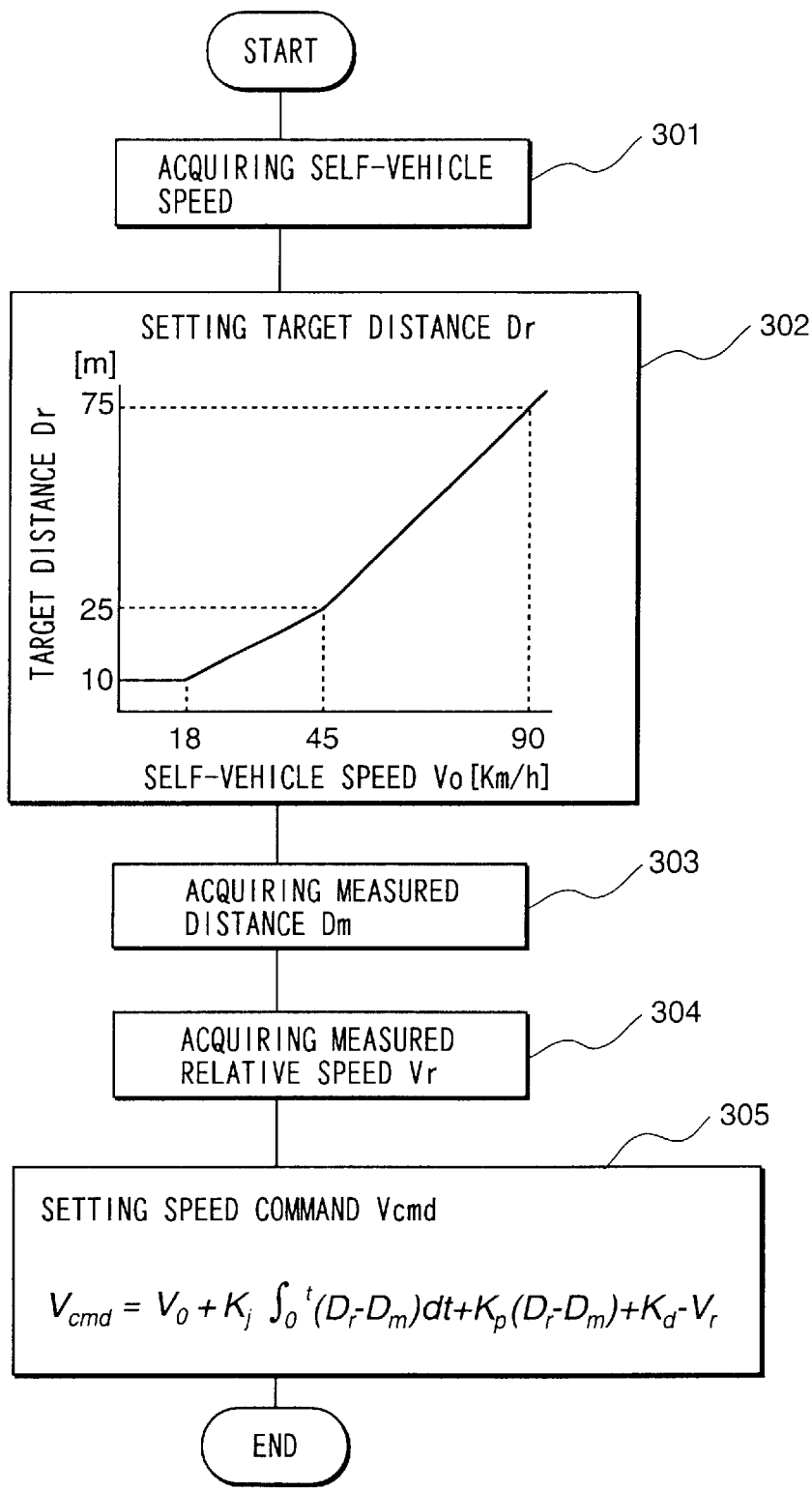
FIG. 5 is a flowchart showing the flow of processing in the target distance setting part and the speed command setting part.

In the target distance setting part 107 and the speed command setting part 108, processing, for example, shown in FIG. 5 is executed.

In Step 301, the self-vehicle speed Vo is acquired from the self-vehicle speed detecting part 110. In Step 302, the target distance Dr corresponding to the self-vehicle speed Vo is set.

As the setting method, for example, the target distance Dr is set to 10 m when the self-vehicle speed Vo is lower than 18 km/h. The target distance Dr is lengthened to a value in proportion to the self-vehicle speed from 10 m when the self-vehicle speed Vo is between 18 km/h and 45 km/h, and the target distance Dr is set to 25 m when the self-vehicle speed Vo is 45 km/h. Further, the target distance Dr is lengthened to a value in proportion to the self-vehicle speed when the self-vehicle speed Vo is lower than 45 km/h, and the target distance Dr is set to 75 m when the self-vehicle speed Vo is 90 km/h. As another setting method, it is possible to employ a method that a target distance is calculated by multiplying a preset time (for instance, 1 second) to a self-vehicle speed Vo.

In Step 303, a measured distance Dm is acquired from the distance detecting part 105. Further, in Step 304, a measured relative speed Vr is acquired. In Step 305, a speed command Vcmd is calculated from the target distance Dr, the measured distance Dm, the measured relative speed Vr and the self-vehicle speed Vo using Equation 3 described below.

$$V_{cmd} = V_0 + K_i \int_0^t (D_r - D_m)dt + K_p(D_r - D_m) + K_d \cdot V_r \quad \text{(Equation 3)}$$

Figure 6:
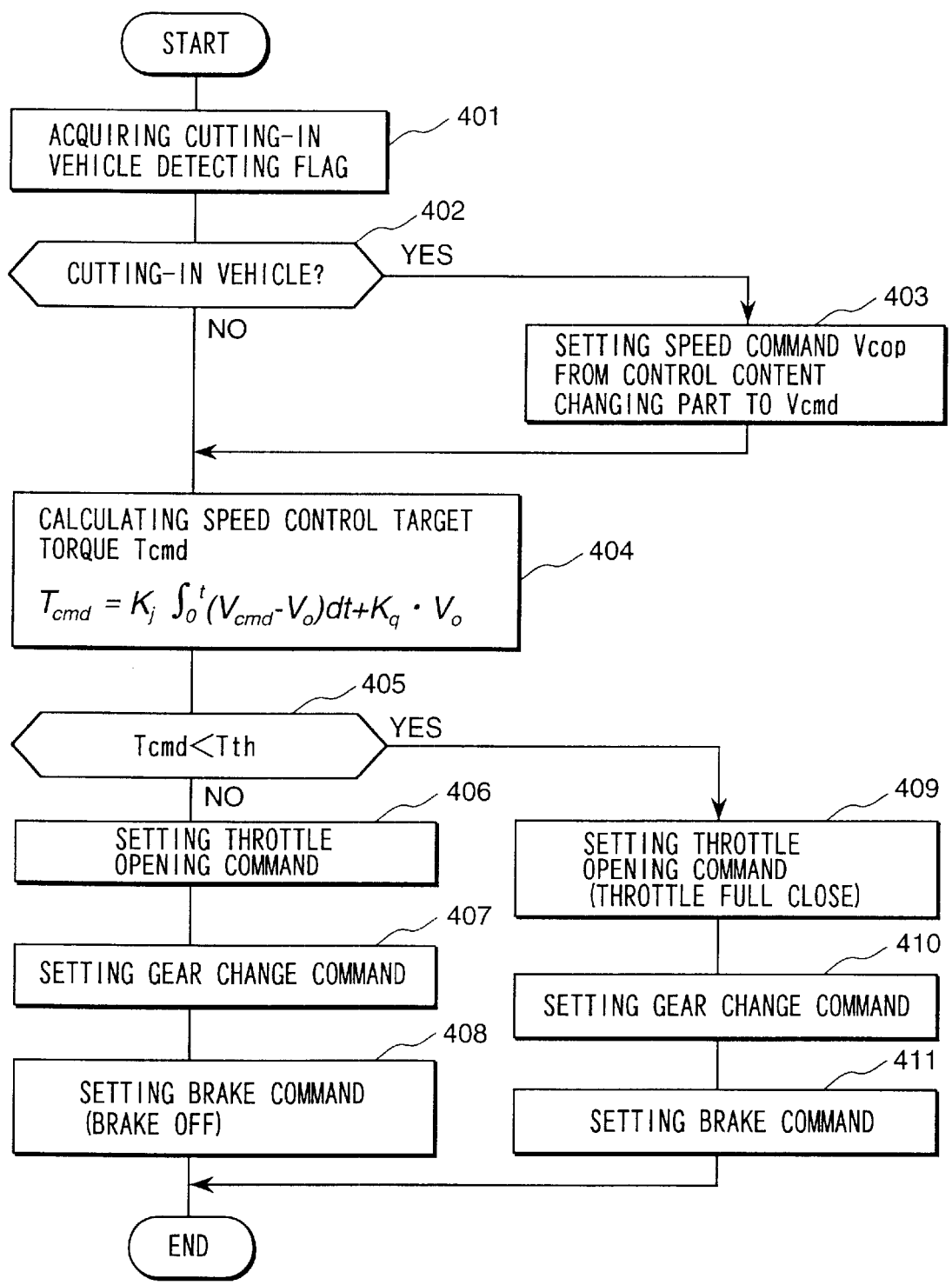
FIG. 6 is a flowchart showing the flow of processing in the vehicle speed control part.

The vehicle speed control part 109 executes processing as shown in FIG. 6.

In Step 401, the cutting-in vehicle detection flag Fc is acquired from the cutting-in vehicle detecting part 101. In Step 402, it is judged whether or not the cutting-in vehicle detection flag is true, that is, whether or not there is a cutting-in vehicle. If there is no cutting-in vehicle, the processing proceeds to Step 404. If there is a cutting-in vehicle, the processing proceeds to Step 403. Step 403 is processing executed when there is a cutting-in vehicle. In Step 403, the speed command Vcop is acquired from the control content changing part 103 and is reset to the speed command Vcmd.

In Step 404, a speed control target torque Tcmd is calculated from Equation 4.

$$T_{cmd} = K_j \int_0^t (V_{cmd} - V_0)dt + K_q \cdot V_0 \quad \text{(Equation 4)}$$

Therein, the values Kj and Kq are preset control constants, and, for example, they are set as Kj=93, Kq=365.

In Step 405, the speed control target torque Tcmd is compared with a preset target torque threshold value Tth. The preset target torque threshold value Tth is a threshold value for selecting which mode the vehicle is controlled by, controlled mainly by the throttle opening command or controlled mainly by the brake command. If Tcmd≧Tth, processing from Step 406 to Step 408 is executed. If Tcmd<Tth, processing from Step 409 to Step 411 is executed.

In the case of Tcmd≧Tth, control is performed to accelerate using mainly the throttle opening command and to decelerate by engine brake. In Step 406, a throttle opening command is set. A target engine torque is calculated from a gear ratio now and the speed control target torque Tcmd, and further the throttle opening command is set from the target engine torque and an engine rotating speed. This method uses the relationship among the engine rotating speed, the throttle opening and the engine torque.

Next, in Step 407, a gear change command is set. When the speed control target torque Tcmd requires deceleration by engine brake, the gear change command is set to shift down the gear. Then, in Step 408, a brake command is set. Since there is no need to operate the brake here, the brake command sets the brake actuator 113 so as to release the brake.

On the other hand, in the case of Tcmd<Tth, decelerating control is performed using mainly the brake. In Step 409, the throttle opening command is set so that the throttle is fully opened because deceleration is performed by controlling the brake. In Step 410, the gear ratio is set. In Step 411, a brake command is set corresponding to the speed command target torque Tcmd. Thus, the self-vehicle speed is controlled by driving the throttle actuator 111 based on the throttle opening command, the transmission actuator 112 based on the gear change command, and the brake actuator 113 based on the brake command.

Processing procedure executed by the control content changing part 102 will be described below, referring to FIG. 7 to FIG. 10.

Figure 7:
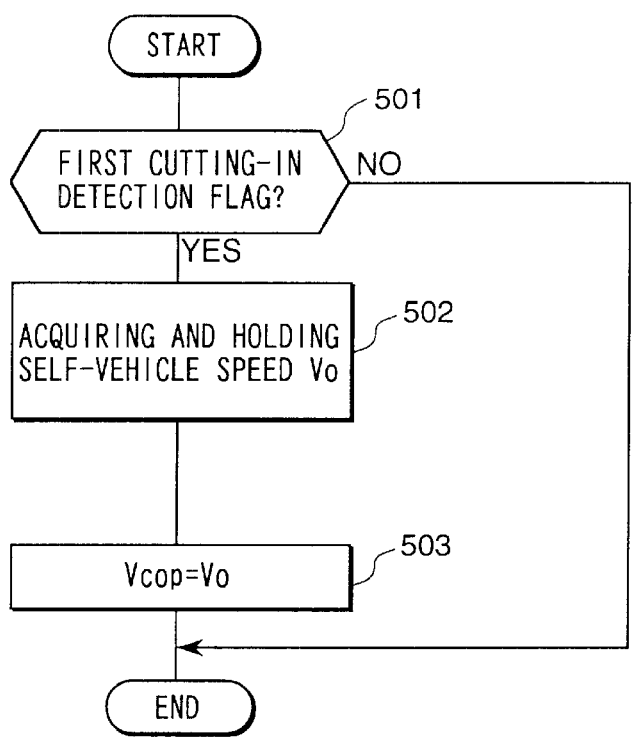
FIG. 7 is a flowchart showing the flow of an example of processing in the control content changing part.

FIG. 7 shows the processing for setting the control content so that when the cutting-in vehicle detecting part 101 detects a cutting-in vehicle, the self-vehicle speed at that time is maintained. The cutting-in vehicle detection flag Fc is acquired from the cutting-in vehicle detecting part 101 in Step 501, and the self-vehicle speed Vo at the time of setting the flag Fc is acquired and held, and after that the self-vehicle speed Vo is not acquired even if the cutting-in vehicle detection flag Fc is set (Step 501 to Step 502). In Step 503, the self-vehicle speed Vo held in Step 502 is set to the speed command Vcop.

Figure 8:
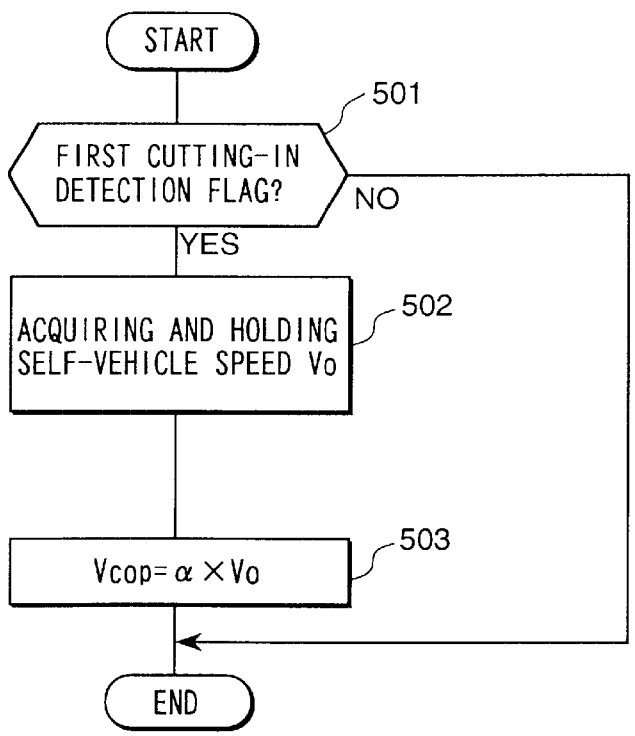
FIG. 8 is a flowchart showing the flow of another example of processing in the control content changing part.

FIG. 8 shows the processing for setting the control content so that when the cutting-in vehicle detecting part 101 detects a cutting-in vehicle, the self-vehicle is decelerated and runs at a speed slower than the self-vehicle speed at that time by a preset ratio. The cutting-in vehicle detection flag Fc is acquired from the cutting-in vehicle detecting part 101 in Step 501, and the self-vehicle speed Vo at the time of setting the flag Fc is acquired and held (Step 502), and after that the self-vehicle speed Vo is not acquired even if the cutting-in vehicle detection flag Fc is set. In Step 601, the self-vehicle speed Vo held in Step 502 is multiplied by a preset value α, and the value is set to the speed command Vcop.

Figure 9:
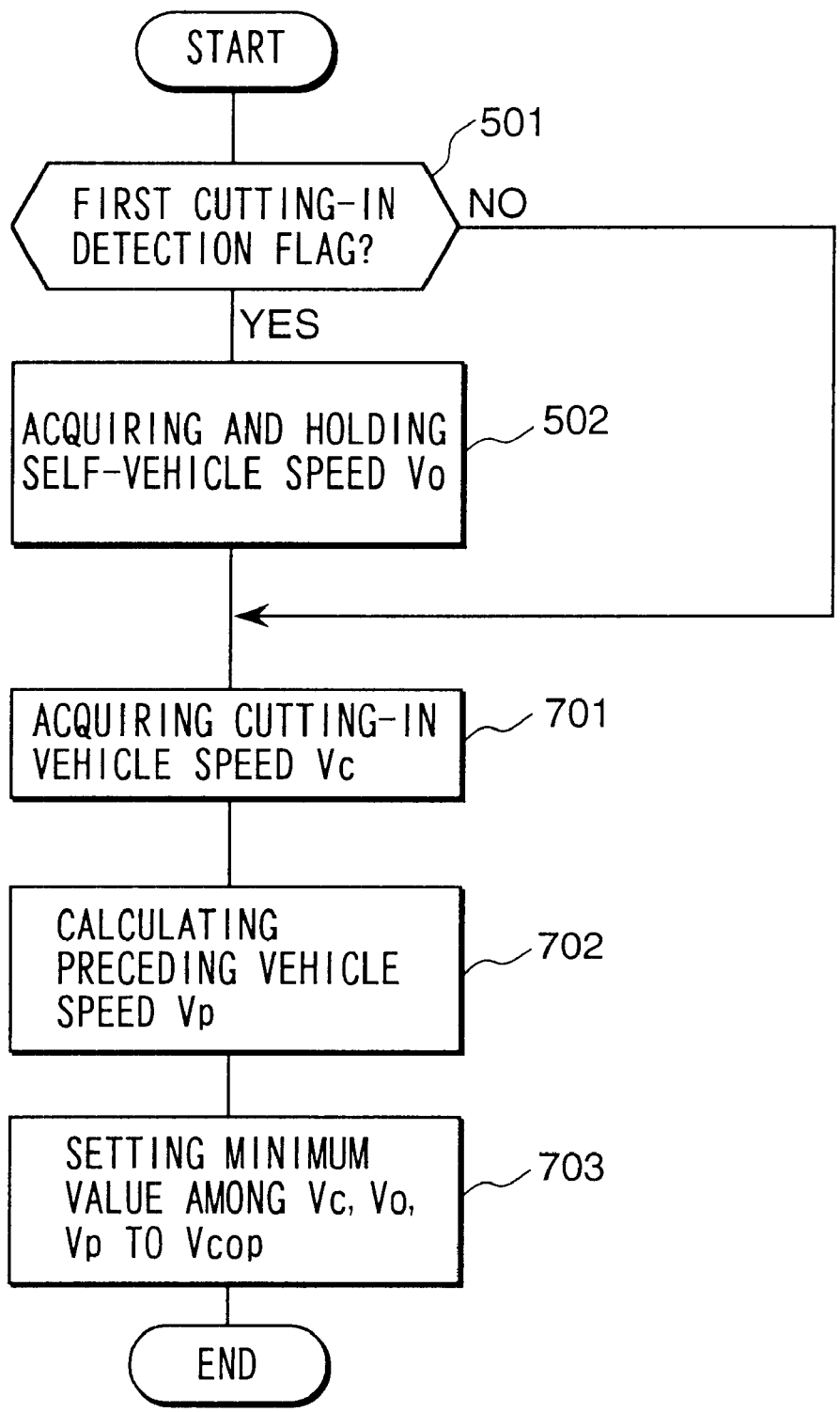
FIG. 9 is a flowchart showing the flow of another example of processing in the control content changing part.

FIG. 9 shows the processing for setting control content so that when the cutting-in vehicle detecting part 101 detects a cutting-in vehicle, the self-vehicle speed, a speed of the preceding vehicle and a speed of the cutting-in vehicle at that time are compared and the self-vehicle runs at the slowest speed among them.

The processing in Step 501 and Step 502 here is the same as the processing in Step 501 and Step 502 in FIG. 7. In Step 701, a speed Vc of the cutting-in vehicle is acquired from the cutting-in vehicle detecting part 101. Next, in Step 702, a relative speed Vr is acquired from the relative speed detecting part 102, and a speed Vp of the preceding vehicle is calculated using the self-vehicle speed Vo. In Step 703, the lowest speed is selected among the self-vehicle speed Vo, the speed Vc of the cutting-in vehicle and the speed Vp of the preceding vehicle, and the value is set to the speed command Vcop.

Each of the above-described control methods is the case where the control content changing part 103 executes each control mode, but it can be considered that the control content changing part 103 executes control by combining the control modes.

Figure 10:
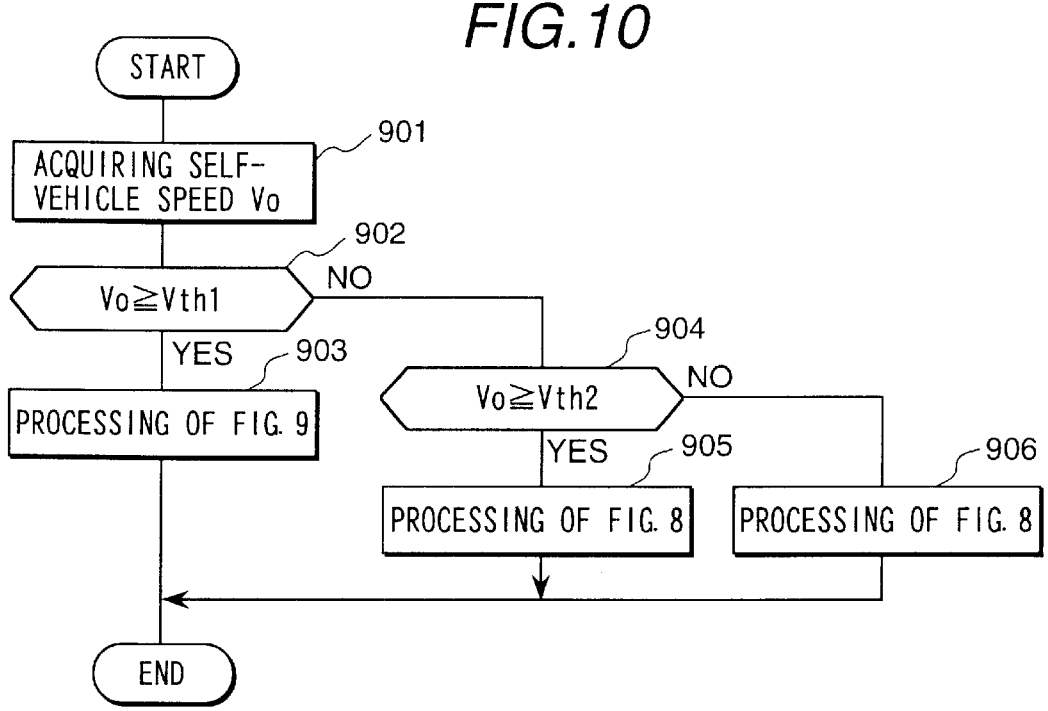
FIG. 10 is a flowchart showing the flow of another example of processing in the control content changing part.

In the processing of FIG. 10, when the cutting-in vehicle detecting part 101 detects a cutting-in vehicle, the control content changing part 103 selects which speed the self-vehicle runs at based on the speed of the self-vehicle at that time, that is, the self-vehicle runs at a speed by keeping the speed of the self-vehicle at that time, runs at a speed by decelerating the speed of the self-vehicle at that time by a preset rate, or runs at the lowest speed among the speed of the self-vehicle, a speed of a preceding vehicle and a speed of the cutting-in vehicle by comparing them.

In Step 901, a self-vehicle speed is acquired. In Step 902, the self-vehicle speed Vo is compared with a preset first value Vth1. If the self-vehicle speed Vo is larger than the value Vth1, the processing proceeds to Step 903. In Step 903, the processing of FIG. 9 is executed. If the self-vehicle speed Vo is smaller than the value Vth1, the processing proceeds to Step 904. In Step 904, the self-vehicle speed Vo is further compared with a preset second value Vth2. If the self-vehicle speed Vo is larger than the value Vth2, the processing proceeds to Step 905. In Step 905, the processing of FIG. 8 is executed. If the self-vehicle speed Vo is smaller than the value Vth2, the processing proceeds to Step 906. In Step 906, the processing of FIG. 7 is executed.

Figure 11:
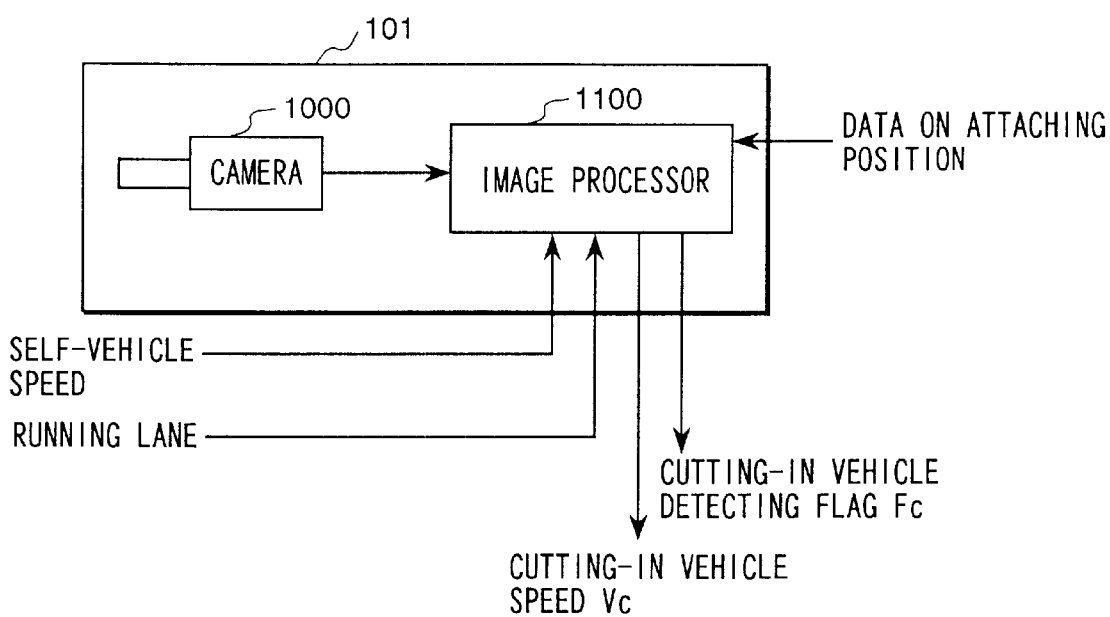
FIG. 11 is a block diagram showing the construction of an embodiment of a cutting-in vehicle detecting part using a running surrounding recognizing sensor in accordance with the present invention.

FIG. 11 is a block diagram showing the construction of an example of the cutting-in vehicle detecting part 101. In the cutting-in vehicle detecting part 101, an image ahead of the self-vehicle is imaged by a camera 1000, and the image is processed by an image processor 1100. In the image processor 1100, the cutting-in vehicle detection flag Fc expressing detection of a cutting-in vehicle and a speed Vc of the cutting-in vehicle are obtained using the acquired image data and a self-vehicle speed Vo detected by the self-vehicle detecting part 110 and information in regard to a running lane detected by the running lane detecting part 115 transmitted through the communication part 100 and the bus 1200.

Further, in the image processor 1100, it is assumed that an imaging range of the camera 1000 is tuned by acquiring data in regard to the mounting position transmitted from the external units 14 and 15 through the bus 1200 in advance or depending on necessity.

Figure 12:
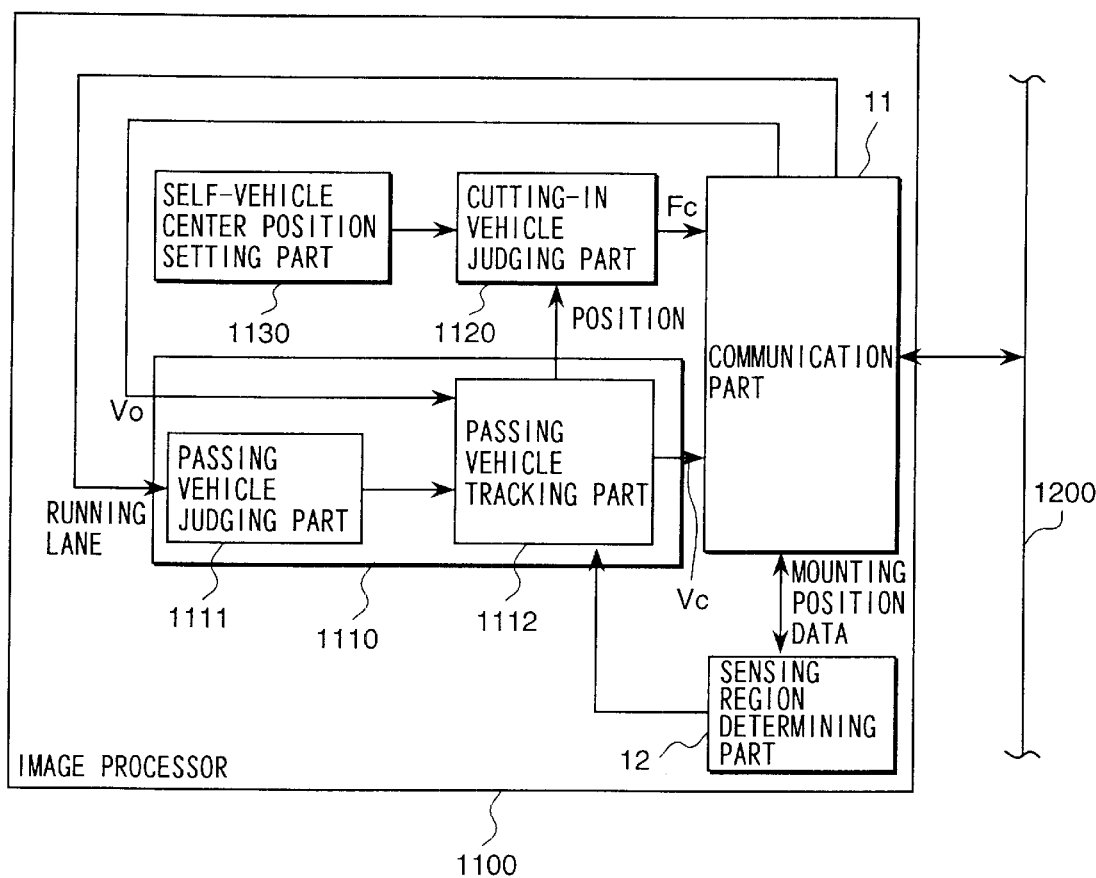
FIG. 12 is a block diagram showing the construction of an image processor.

FIG. 12 is a functional block diagram showing the construction of the image processor 1100 in this example at performing cutting-in vehicle detection.

The image processor 1100 in this example is composed of a vehicle recognizing part 1110 for recognizing a position of a vehicle ahead of the self-vehicle from image information imaged by the camera 1000, a cutting-in vehicle judging part 1120 for judging the cutting-in vehicle from a self-vehicle center position and the position of the vehicle ahead of the self-vehicle, a self-vehicle center setting part 1130 for setting the self-vehicle center position, a communication part 11 and a sensing region determining part 12.

The communication part 11 executes communication with external units through the bus 1200 to receive data in regard to a mounting position, a self-vehicle speed and a running lane and to send a cutting-in vehicle detection flag and a cutting-in vehicle speed.

The sensing region determining part 12 receives the mounting position data, for example, data expressing a mounting height, an attitude of the vehicle and a load distribution transmitted through the bus 1200 and the communication part 11, and determines a sensing region corresponding to the image region imaged by the camera 1000 using the data.

The vehicle recognizing part 1110 comprises a passing vehicle judging part 1111 and a passing vehicle tracking part 1112 which are for detecting and tracking a passing vehicle using the information of the sensing region of the camera 1000 determined by the sensing region determining part 1 and the image imaged at that time. The passing vehicle judging part 1111 detects a vehicle passing the self-vehicle. When the passing vehicle judging part 1111 detects a passing vehicle, the passing vehicle tracking part 1112 tracks the passing vehicle to obtain a position of the passing vehicle from the image, and at the same time calculates a speed of the passing vehicle from an amount of motion from the image frame and the self-vehicle speed.

Although the self-vehicle center position setting part 1130 in this construction is placed inside the image processor 1100, it is possible to receive information in regard to the self-vehicle center position from the external and to use the information.

Figure 13:
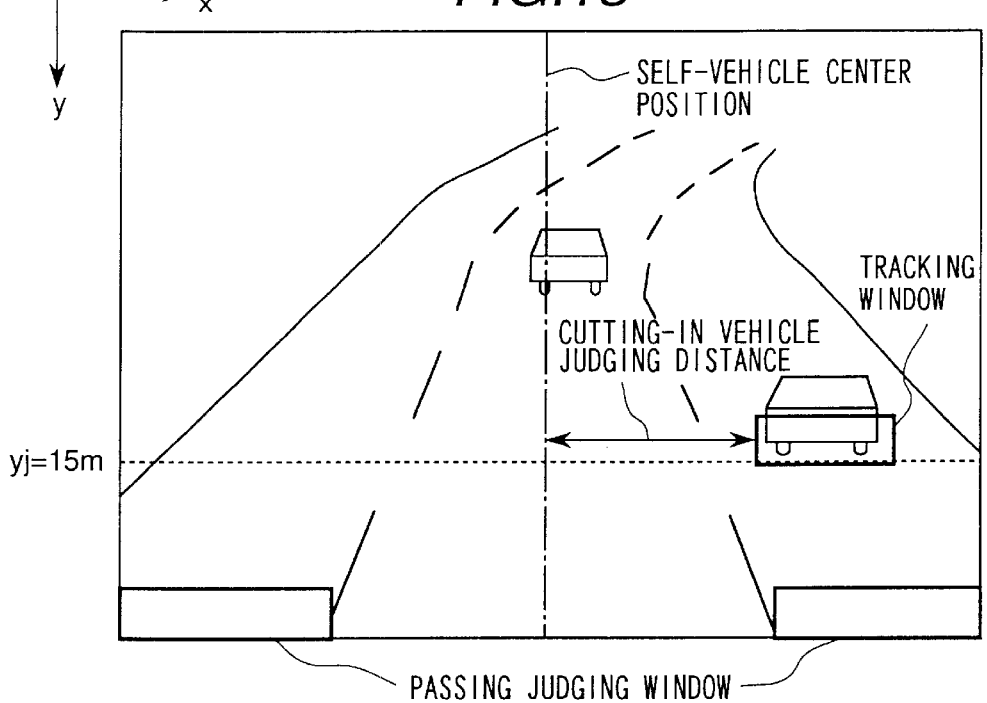
FIG. 13 is a view explaining an example of processing in the vehicle recognizing part.

Description will be made below on an example of the method that the passing vehicle judging part 1111 detects a vehicle passing the self-vehicle, referring to FIG. 13. FIG. 13 shows a forward image imaged by a camera mounted on the self-vehicle, The image shows the condition that the self-vehicle is running on the middle lane of a three-lane road, and following a preceding vehicle in the sight ahead of the self-vehicle with keeping a constant distance between the preceding vehicle and the self-vehicle.

A cutting-in vehicle generally passes the self-vehicle and cuts in between the preceding vehicle and the self-vehicle from a traffic lane adjacent to a traffic lane on which the self-vehicle is running. Therefore, as shown in FIG. 13, a passing vehicle judging window is set on a traffic lane adjacent to the self-vehicle running lane. In FIG. 13, two passing vehicle judging windows are set. Change in brightness inside the widows is checked every time.

According to this method, accuracy in vehicle recognition can be improved because the brightness inside the passing vehicle judging window is suddenly changed when a passing vehicle is coming. When the brightness inside the passing vehicle judging window is suddenly changed, this change is regarded as existence of a passing vehicle, and tracking of the passing vehicle is started.

Therein, if a traffic lane of the self-vehicle running can be judged using a navigation device or the like, that is, if it can be judged that the self-vehicle is running on the left end traffic lane or on the right end traffic lane, a setting position of the passing vehicle judging window can be control. For example, when the self-vehicle is running on the left end traffic lane, the passing vehicle judging window can be set only in the right hand side because there is no traffic lane in the left hand side. When the self-vehicle is running on the right end traffic lane, the passing vehicle judging window can be set only in the left hand side because there is no traffic lane in the right hand side.

When it is judged that a passing vehicle exists, the passing vehicle tracking part 1112 has a part of the image inside the passing vehicle judging window as a template, and tracking of the passing vehicle can be performed by correlation calculation to find the most similar portion to the template from the image acquired next. The position of the passing vehicle can be performed using Equation 2. FIG. 13 shows that in tracking of a passing vehicle, the position of the passing vehicle is estimated 15 m ahead of the self-vehicle from a y-coordinate on the image of the most similar portion to the template.

Further, by calculating a displaced distance between the two images, a relative speed of the passing vehicle can be estimated and a speed of the passing vehicle can be calculated using a self-vehicle speed.

Furthermore, the passing vehicle tracking part 1112 output an X-coordinate on the image of the passing vehicle obtained by the correlation calculation to the cutting-in vehicle judging part 1120.

Figure 14:
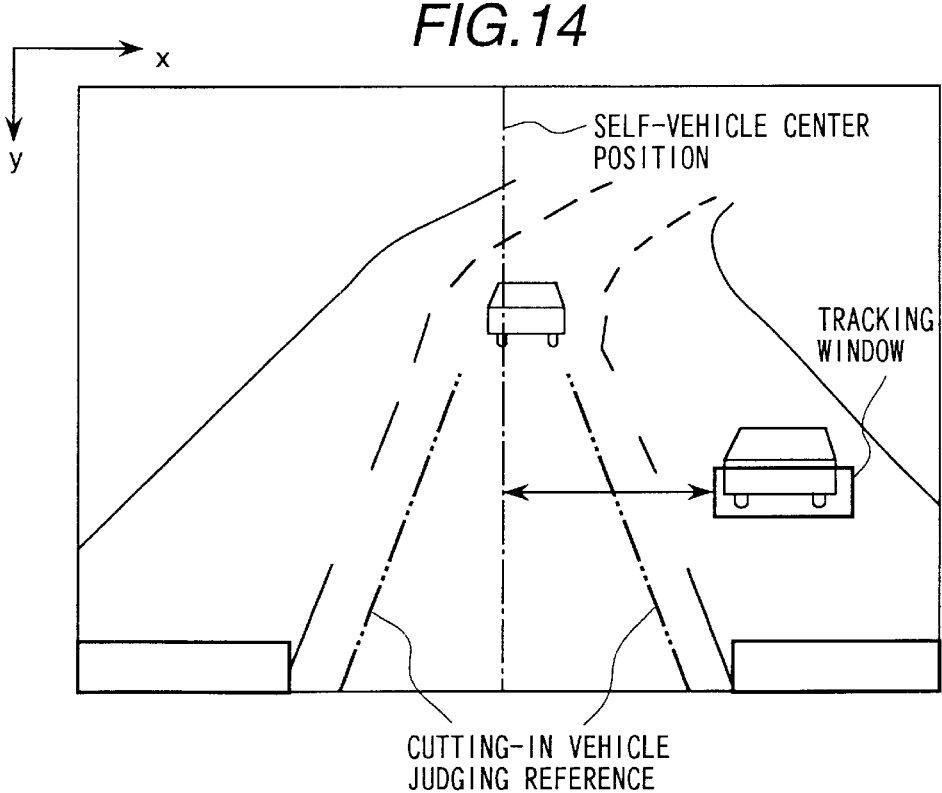
FIG. 14 is a view explaining an example of processing in the cutting-in vehicle judging part.

An example of a method of judging a cutting-in vehicle executed in the cutting-in vehicle judging part 1120 will be described below, referring to FIG. 14.

Using the x-coordinate and an x-coordinate of the self-vehicle center position (shown by a dash-dot line in FIG. 14) on the image, the cutting-in vehicle judging part 1120 judges whether or not the passing vehicle is cutting in to the traffic lane of the self-vehicle running on. For example, as shown in FIG. 14, it can be judged whether or not the distance between the x-coordinate of the self-vehicle center position on the image and the x-coordinate of the passing vehicle calculated by the passing vehicle tracking part 1112 becomes smaller than a preset distance (a cutting-in vehicle judgment reference, shown by double-dot chain lines in FIG. 14).

Further, the preset distance as the cutting-in vehicle judgment reference may be changed depending on the speed of the self-vehicle. For example, when the self-vehicle speed is faster than a preset value, the distance is moved apart, that is, moved to a position closer to the boundary of the traffic lane of the self-vehicle running. When the self-vehicle speed is slower than a preset value, the distance is moved near, that is, moved to a position closer to the self-vehicle center position.

By doing so, when the self-vehicle is running at a high speed, it is possible to cope with the cutting-in vehicle earlier. In the above embodiments, the data in regard to a mounting position of the running surrounding recognizing apparatus 1 on the vehicle is received from the external, and the sensing region of the apparatus 1 is determined. However, the running surrounding recognizing apparatus in the present invention is not limited to the above. For example, it is possible that the sensed data sensed by the running surrounding recognizing apparatus 1 and the sensing region determined by the sensing region determining part 12 are communicated with an external unit through the communication part 11.

Figure 15:
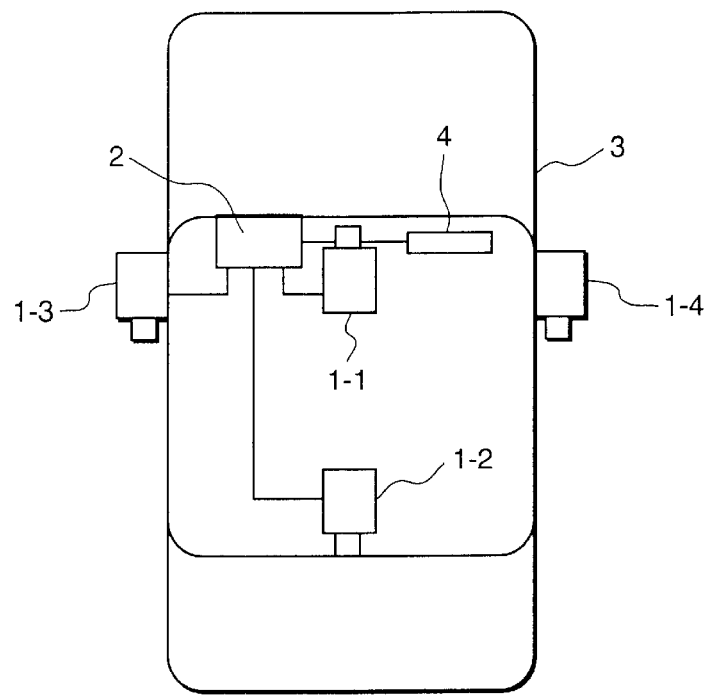
FIG. 15 is a view showing the construction of another embodiment of a system using a running surrounding recognizing sensor.

Further, as shown in FIG. 15, a system composed of a plurality of running surrounding recognizing apparatuses having the construction as described above 1-1 to 1-4 may be mounted on a vehicle 3. In this example of construction, a control unit 2 communicate sensing data and a sensing region with each of the running surrounding recognizing apparatuses 1-1 to 1-4, and the result is displayed on a display unit 4.

Figure 16:
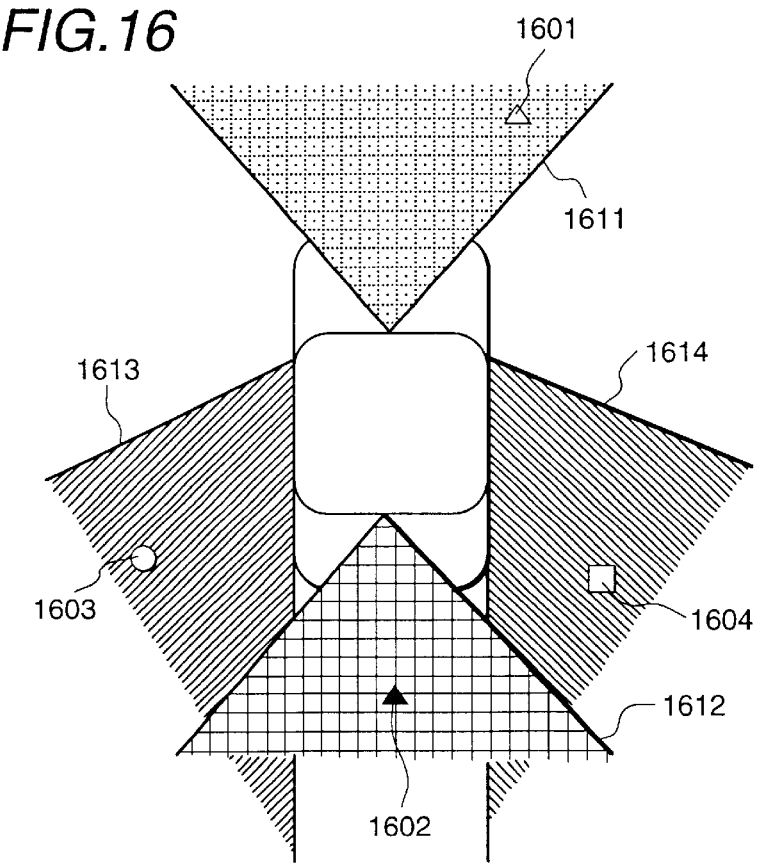
FIG. 16 is a view showing an example of a display in the system of FIG. 15.

When the surrounding status of the self-vehicle is displayed on the display unit 4, the method of displaying the sensed result corresponding to each of the running surrounding recognizing apparatuses is changed from apparatus to apparatus, as shown by the reference characters 1601 to 1604 in FIG. 16. Thereby, a driver can judge at a glance which apparatus the data is sensed by. Not only display of the sensed results (1601 to 1604), sensing regions of each of the running surrounding recognizing apparatuses may be distinguishably displayed corresponding to each of the apparatuses, as shown by the reference characters 1611 to 1614.

Further, if each of the running surrounding recognizing apparatuses 1-1 to 1-4 can judge the mutual sensing regions through communication, or if a vehicle sensed at the boundary of the sensing region of one specified apparatus among the running surrounding recognizing apparatuses can be sensed by another of the running surrounding recognizing apparatus, a confidence level may be added to the sensed data corresponding to each of the sensing region, for example, 100% confidence level for a central portion of the sensing region, 50% confidence level for the boundary of the sensing region and so on. When the sensed data is to be used, it may be judged based on the value of the confidence level whether or not the data should be used.

Further, although the above embodiment has a means for determining a sensing region in each of the running surrounding recognizing apparatuses, the present invention is not limited by the embodiment. For example, instead of providing each of the running surrounding recognizing apparatuses with a sensing region determining part, it is possible that one of the running surrounding recognizing apparatuses receives data in regard to the mounting position of each of the running surrounding recognizing apparatuses, and determines each of the sensing regions, and transmits the determined sensing regions to the corresponding running surrounding recognizing apparatuses by communication. In this case, each of the running surrounding recognizing apparatuses executes recognizing operation based on the sensing region sent through the communication means.

By employing such a construction, the running surrounding recognizing apparatus can be formed in a small sized module.

According to the present embodiment, it is possible to accurately recognize information in regard to running of a self-vehicle even if a mounting position of a sensor for the running surrounding recognizing apparatus is changed.

Further, according to the present embodiment, the sensor contained in the running surrounding recognizing apparatus can be efficiently tuned.

What is claimed is:

1. A running surroundings recognition apparatus for mounting on a vehicle and recognizing running surroundings of the vehicle using a sensor, which apparatus comprises:

a communication means for receiving an input of externally generated data in regard to a mounting position of said sensor on the vehicle and relative to a surface on which the vehicle is operated;

a sensing region determining means for determining spatial location of a sensing region which is sensed by said sensor, based on said externally generated data received through said communication means; and a recognizing means for recognizing running surroundings based on the spatial location of the sensing region determined by said sensing region determining means, and on a sensed result by said sensor.

2. A running surroundings recognition apparatus according to claim 1, which comprises a running control content changing means for changing a running control content of said vehicle based on an output of said recognizing means.

3. A running surroundings recognizing apparatus according to claim 1, wherein said communication means communicates at least a recognized result obtained by said recognizing means among a sensed result sensed by said sensor, a sensing region determined by said sensing region determining part and the recognized result with an external apparatus.

4. A running surroundings recognizing system for recognizing surroundings of a vehicle, said system having a plurality of running surroundings recognizing apparatuses according to claim 3 mounted on the vehicle, and said system comprising:

a communication means for performing data communication between said plurality of running surroundings recognizing apparatuses; and a processing means for generating image data for displaying a status around the vehicle using data sent from each of the running surroundings recognizing apparatuses through said communication means and for sending the generated image data to a display unit;

wherein said processing means changes display methods corresponding to individual running surroundings recognizing apparatuses for generating said image data, so that the data from each of the running surroundings recognizing apparatuses can be distinguished from the others.

5. A running surroundings recognizing system for recognizing surroundings of a vehicle, said system having mounting, a plurality of running surroundings recognizing apparatuses according to claim 3 mounted on the vehicle, and said system comprising:

a communication means for performing data communication between said plurality of running surroundings recognizing apparatuses;

a processing means for generating image data for displaying a status around the vehicle using data sent from each of the running surroundings recognizing apparatuses through said communication means and for sending the generated image data to a display unit; and a confidence level adding means for adding a confidence level corresponding to a sensing region of each of the running surroundings recognizing apparatuses to the data output from each of said running surrounding recognizing apparatuses.

6. A running surroundings recognizing apparatus mounted on a vehicle, for recognizing running surroundings of the vehicle using a sensor, which comprises:

a receiving means for receiving externally generated data in regard to spatial location of a sensing region of said sensor relative to the vehicle; and a recognizing means for recognizing running surroundings based on spatial location said received sensing region and a sensed result by said sensor.

7. A system for analyzing operating surroundings of a vehicle, comprising:

a sensor mounted on said vehicle and positioned to sense information concerning vehicle surroundings within a sensing field;

means for sensing spatial information concerning a spatial position and orientation of said sensor relative to said vehicle and relative to a surface on which the vehicle is operated;

communication means for receiving an input of said spatial position information;

a sensing field determining means for determining a spatial location of said sensing field, based on said spatial information received by said communication means; and analyzing means for analyzing said vehicle operating surroundings based on the spatial location of the sensing field determined by the sensing field determining means, and on sensed information generated by said sensor.

* * * * *